(12) United States Patent
Dircx

(10) Patent No.: US 10,954,337 B2
(45) Date of Patent: *Mar. 23, 2021

(54) MODIFIED HOT RUNNER SYSTEMS FOR INJECTION BLOW MOLDING

(71) Applicant: KEIRYO PACKAGING SA, Luxembourg (LU)

(72) Inventor: Steven Dircx, Heffen (BE)

(73) Assignee: KEIRYO PACKAGING SA, Luxembourg (LU)

( * ) Notice: Subject to any disclaimer, the term of this patent is extended or adjusted under 35 U.S.C. 154(b) by 218 days.

This patent is subject to a terminal disclaimer.

(21) Appl. No.: 16/158,392

(22) Filed: Oct. 12, 2018

(65) Prior Publication Data
US 2019/0048134 A1 Feb. 14, 2019

Related U.S. Application Data

(62) Division of application No. 14/219,336, filed on Mar. 19, 2014, now Pat. No. 10,106,646, which is a division of application No. 12/602,241, filed on Nov. 30, 2009, now Pat. No. 8,715,563.

(51) Int. Cl.

| | |
|---|---|
| *C08G 63/183* | (2006.01) |
| *B29C 49/06* | (2006.01) |
| *B29C 45/28* | (2006.01) |
| *B29C 45/30* | (2006.01) |
| *C08L 67/03* | (2006.01) |
| *B29C 49/00* | (2006.01) |
| *B29C 45/00* | (2006.01) |
| *B29K 105/00* | (2006.01) |

(52) U.S. Cl.
CPC ........ *C08G 63/183* (2013.01); *B29C 45/2806* (2013.01); *B29C 45/30* (2013.01); *B29C 49/06* (2013.01); *C08L 67/03* (2013.01); *B29C 49/0005* (2013.01); *B29C 2045/0098* (2013.01); *B29C 2045/304* (2013.01); *B29K 2105/253* (2013.01); *B29K 2995/0041* (2013.01); *Y10T 428/1352* (2015.01); *Y10T 428/1397* (2015.01)

(58) Field of Classification Search
None
See application file for complete search history.

(56) References Cited

U.S. PATENT DOCUMENTS

| | | | |
|---|---|---|---|
| 5,011,648 A | 4/1991 | Garver et al. | |
| 5,421,715 A | 6/1995 | Hoffstetter et al. | |
| 5,948,450 A | 9/1999 | Swenson et al. | |
| 10,106,646 B2 * | 10/2018 | Dircx | B29C 45/30 |
| 2002/0090473 A1 | 7/2002 | Lee et al. | |

FOREIGN PATENT DOCUMENTS

| | | |
|---|---|---|
| EP | 0947304 A2 | 10/1999 |
| EP | 1215028 A2 | 6/2009 |

* cited by examiner

*Primary Examiner* — Monica A Huson
(74) *Attorney, Agent, or Firm* — Edwin A. Sisson, Attorney at Law, LLC

(57) ABSTRACT

A container made by blow molding out of crystallisable polymers having regular sequence of variations in molecular pre-alignment/orientation between different locations of the cross-section of the preform.

13 Claims, 4 Drawing Sheets

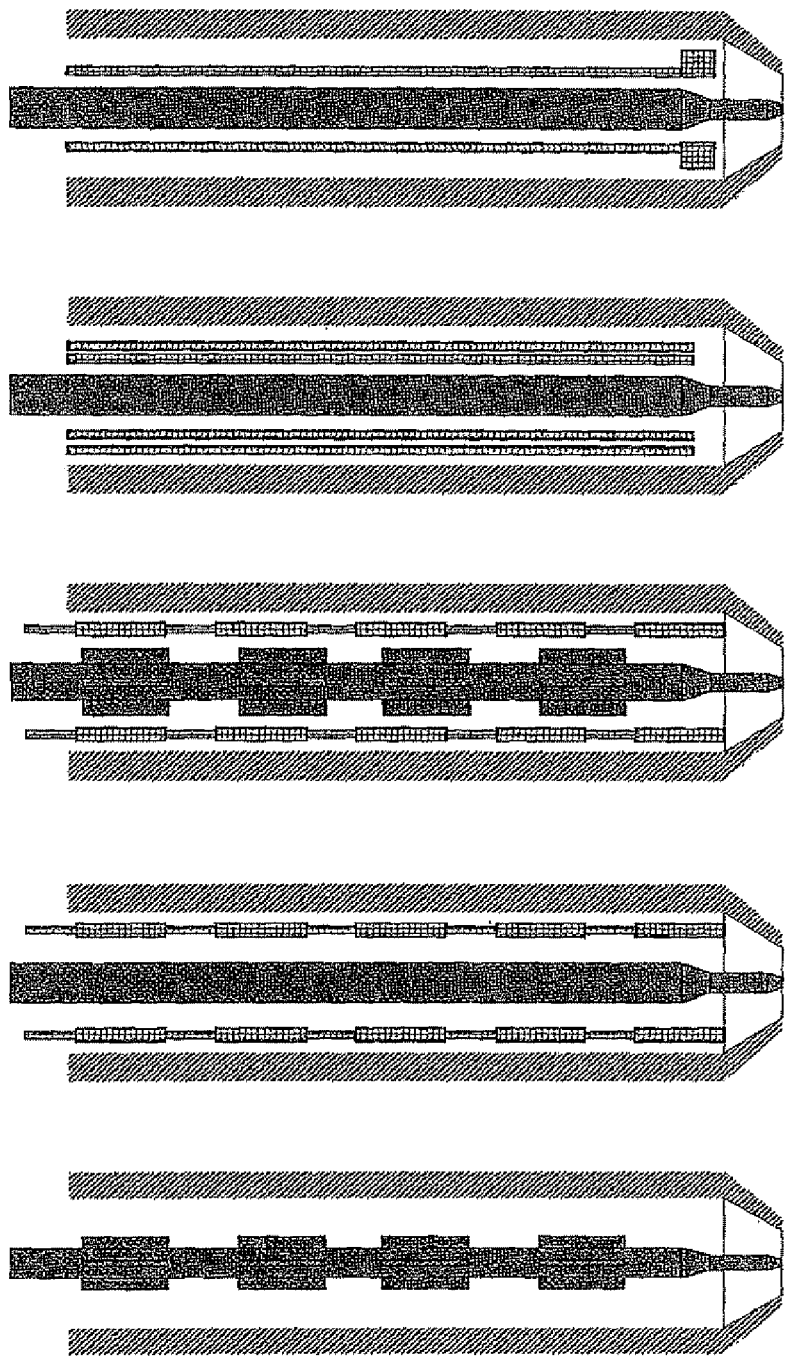

MODIFIED HOT RUNNER SYSTEMS FOR INJECTION BLOW MOLDING

CROSS REFERENCE TO RELATED APPLICATIONS

This application is a divisional application of U.S. application Ser. No. 14/219,336 filed Mar. 19, 2014, which is a divisional application of U.S. application Ser. No. 12/602,241 filed Nov. 30, 2009, which has been granted as U.S. Pat. No. 8,715,563, both of which are incorporated by reference herein in their entirety.

FIELD OF THE INVENTION

The present invention relates in general to new developments of thermoplastic preforms in particular of the type used for blow molding containers, and more particularly to preforms having a crystallized neck for resistance to deformation at elevated temperatures. It also relates to a method for producing said containers and, in particular, to preforms used for their production, as well as a method for producing said preforms.

BACKGROUND OF THE INVENTION

The use of plastic containers as a replacement for glass or metal containers in the packaging of beverages has become increasingly popular. Several types of plastics have been used, ranging from aliphatic and aromatic polyolefins (polyethylene, polypropylene, polystyrene) over halogenated polymers (polyvinyl chloride, polyvinylidene chloride) and aliphatic polyamides (nylons) to aromatic polyesters. As far as the rigid food packaging sector is concerned, polyethylene terephthalate (PET), an aromatic polyester, is by far the most widely used resin. This choice is driven by its unique material properties, combining amongst others shatter resistance, lightweight, high mechanical strength, transparency, recyclability, . . . Beverage applications, both for carbonated and non-carbonated products, constitute the single largest application area for PET containers. Most PET containers are made by stretch blow molding of preforms which have been made by processes including injection molding. In some circumstances, it is preferred that the preform resin is amorphous or only slightly semi-crystalline in nature, as this allows for stretch blow molding. Highly crystalline preforms generally are difficult, if not impossible to stretch blow mold.

With plastic materials (like PET) being derived from oil, the ongoing increases in resin, oil and energy pricing has created significant pressure on package owners to reduce the total cost of ownership of their plastic packaging mix. This in turn drives focus on finding solutions which enable to further reduce the wall thickness of these plastic (like PET) containers (light-weighting) whilst maintaining the inherent overall performance characteristics and design flexibility. It also challenges the plastic material converting industry to increase the output of its plastic material converting platforms, on processes like injection and stretch blow molding. The combination of reduced material utilization and increased production manufacturing output reduces the total cost of ownership for both preforms and containers.

At the same time, in some specific end market applications, increased performance specifications are requested on parameters including thermal stability, barrier performances and mechanical rigidity. Such a specific end market application requesting increased performance specifications for PET containers includes hot-fill containers, which must withstand filling with hot liquid products without significant deformation, followed by sealing and a cooling process which creates a vacuum in the container, due to the volume contraction of the hot filled liquid.

A particular problem associated with these hot-fill containers concerns the thermal stability of both the body, but especially the neck finish of the container throughout the hot filling process, because increase in temperature during the process induces molecular relaxation and shrinkage in the container material. The higher the crystallinity of the container, the more the container is resistant to said relaxation. When an essentially amorphous or only slightly semi-crystalline preform is converted into a container by the stretch blow molding process, the process conditions determine the amount of crystallinity that is induced in the different container parts. Unless special precautions are taken and/or additional process steps are included, the neck finish, being clamped and restricted from stretching, will receive almost no increase in crystallinity. Any increase obtained will always be negligible in comparison to the increase induced in the stretched main body.

Any container part made entirely of amorphous or only slightly semi-crystalline PET may not have enough dimensional stability during a standard hot-fill process to resist the relaxation process and hence meet the specifications required when using standard threaded closures.

Unacceptable volume shrinkage of the container and/or especially of the neck area may create leaks between the neck and closure, thus increasing exposure to micro-organisms, whilst increasing gas ingress and/or egress. This can lead to non-specification compliant quality issues and, in case of food applications, to potentially consumer hazardous situations when pathological micro-organisms are able to grow inside the packed food matrix.

In these circumstances, a container comprising increased amounts of crystalline PET, especially in the neck finish, would be preferred, as it would hold its shape during hot-fill processes.

Another application in which plastic containers are subjected to elevated temperatures, include pasteurisable containers which, after filling and sealing, are then exposed to an elevated temperature profile for a defined time period. Throughout the pasteurization process, the sealed container must have dimensional stability so as to remain tight and within the specified volume tolerance.

Yet another high-temperature application is the use of plastic returnable and refillable containers for both carbonated and non-carbonated beverages, whereby the container must withstand wash and reuse cycles. Such containers are filled with a carbonated or non-carbonated beverage, sold to the consumer, returned empty, and washed in a hot, potentially caustic solution prior to refilling. These repeated cycles of thermal exposure make it difficult to maintain the overall shape, appearance and threaded neck finish within the tolerances required to ensure adequate functionality and/or general consumer acceptance.

A number of methods have been proposed to address said problems of elevated temperature impact on plastic containers throughout their filling or use cycle, thereby ensuring that the required specifications for volume shrinkage, shape retention, neck softening and others are met.

One such method consists of adding an additional manufacturing step that exposes the neck finish and/or body part of the preform or container to a heating element in order to thermally crystallize the neck finish and/or body part of the preform or container . However, the required capital investments, the increased manufacturing processing time and costs for specific materials and/or auxiliaries lead to an increased overall cost of ownership and increased total product cost. As previously stated, the overall cost of producing a container is very important and needs to be tightly controlled because of competitive market and business pressures.

Alternative methods of strengthening the neck finish involve crystallizing select portions of the neck finish, such as the top sealing surface and flange. Again, this requires an additional heating step and increased processing time.

Another alternative is to use a high glass transition temperature material in one or more layers of the neck finish. Generally, this involves more complex preform injection molding procedures to achieve the necessary layered structure in the finish.

Another alternative method includes specific container design and design features such as to compensate for the developed vacuum through the hot-fill process.

A particular performance characteristic associated and critical to carbonated beverage containers, include barrier performance i.e. the control of gas ingress and/or egress. To conserve the taste of the beverage and hence increase the shelf life of the product, it is essential that the gas mixture in the container remains unchanged for as long as possible after the filling process. Different methods are being used nowadays to enhance the barrier properties of the container walls, including passive methods (co-extrusion multilayer approaches, coating applications, nanotechnology) and active methods (oxygen scavenger incorporation) and combinations thereof. All these methods significantly increase the cost of ownership.

With respect to mechanical properties, commercial articles in general made out of polyesters and more specifically out of PET depend primarily on some degree of orientation induced during the manufacturing processes to enhance the mechanical properties.

The degree of molecular orientation and the physical properties of the resulting oriented article are governed o.a. by the strain rate applied during processing, by the stretch ratio, by the molecular weight of the resin and by the temperature at which the orientation takes place. Bi-axial orientation during stretch blow molding when transforming a preform into a container leads to strain induced crystallization. This in turn improves mechanical strength and barrier properties. The amount of crystallinity reached and the crystal shape depend on the strain rate and the stretching temperature. State of the art production methods are optimized to enhance the mechanical strength by stretching the amorphous preform to maximal strength within the limits of the material characteristics. Typical average applied stretch ratios amount to up to 4.5 in the circumferential direction and up to 3.2 in the axial direction. Exceeding these limits and entering ranges of too high stretch ratios lead to the creation of micro voids and premature container failure.

A particular problem when blow molding remains generating enhanced mechanical strength in the neck finish and in the bottom portion of the container in light of the negligible respectively low stretch ratios in these specific areas.

Especially in the case of containers intended for filling with carbonated soft drinks this local reduction in strength leads to more severe container deformation and consequently to a reduction of dissolved carbon dioxide in the soft drink and to a decreased shelf life. To alleviate the inherent weakness of these particular areas recourse is taken to preforms exhibiting significant higher wall thicknesses in neck finish and bottom area.

Another widely used method to capitalize on the induced crystallinity and to extend it into less oriented areas is the process called heat-setting, in which the transformation from amorphous preform to crystalline container is preformed at high temperature for rather prolonged exposure cycle times.

A particular limitation, state of the art production methods suffer from, stems from the preheating prior to stretch blow molding the container and more specifically to the heat history heat-set containers are subjected to.

In the heat-set process the preform and resulting container are exposed to significantly higher temperatures then is the case for so-called cold-drawn bottles, as e.g. used for water and carbonated soft drinks. A typical preform reheat temperature for a heat-set container amounts to 130° C. versus 90-100° C. for cold-drawn containers. Following the preform is stretch blown in a heated container blow mold where only the inner container wall is air cooled.

Typical heat-set container mold temperatures are in the range of 160° C. In contrast a cold-drawn container is blown in a mold kept at around 20°.

This thermal treatment destroys most of the stretch induced orientation as relaxation processes have ample time to develop. As a consequence the resulting heat-set container looses a substantial amount of mechanical strength. The ultimate mechanical strength reached in the heat-set bottle is achieved predominately by additional crystallization through the prolonged thermal treatment.

Overall the resulting heat-set container strength is lower than that of a typical cold-drawn container.

Therefore heat-set containers necessitate higher material demand, longer process cycle times and the application of more energy compared to cold-drawn containers.

From the above it is clear that it would be desirable to provide a method of manufacturing a preform made out of crystallizable polymers for a container having a neck finish which resists deformation, particularly at elevated temperatures, characterized in that it is produced within the standard processing time frame and/or limited extensions thereof.

It is equally clear that it would be desirable to provide a method of manufacturing a preform made out of crystallizable polymers for a container having, at optimized wall thicknesses, equal or superior end performance properties including, amongst others, gas permeation resistance and mechanical strength.

According to a first embodiment of the present invention, the present invention is directed to a method for making out of crystallizable polymers an article in general, or more specifically a preform and resulting stretch blow molded container, providing equal or superior end performance characteristics. Said method includes hot runner system modifications, thereby inducing new structures both at the level of preform and/or container.

Another embodiment of the present invention provides a method and apparatus for the cost-effective manufacture of such articles in general, specifically injection molded preforms and stretch blow molded containers.

SUMMARY OF THE INVENTION

The present invention describes a method for producing preforms and containers made out of crystallizable polymers, in particular of the type used for stretch blow molded containers, and more particularly preforms and containers with optimized wall thickness, yet superior overall performance characteristics, including enhanced resistance to thermal deformation both in the body and especially the neck finish, gas permeability resistance and mechanical strength.

BRIEF DESCRIPTION OF THE DRAWINGS

Examples of different embodiments of the invention will now be explained in more detail with reference to the drawings, wherein:

FIG. 2 illustrates one embodiment of the hot runner modification of the injection system;

FIG. 3 illustrates a second embodiment of the hot runner modification of the injection system;

FIG. 4 illustrates a third embodiment of the hot runner modification of the injection system;

FIG. 5 illustrates a fourth embodiment of the hot runner modification of the injection system;

FIG. 6 illustrates a fifth embodiment of the hot runner modification of the injection system;

DETAILED DESCRIPTION

Figure 1:
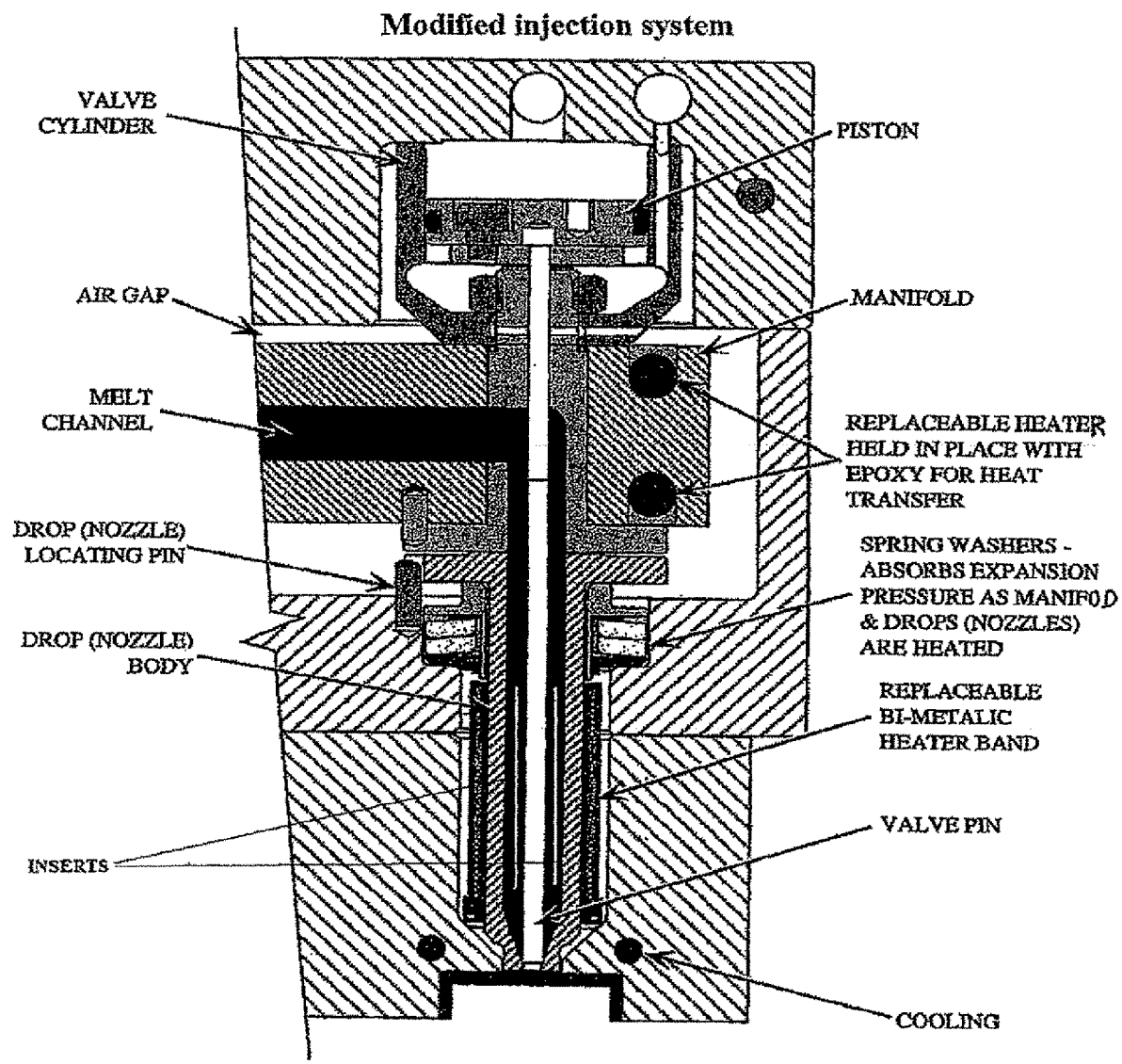
FIG. 1 illustrates an injection system that uses the specially designed inserts, i.e., hot runner modifications, according to the present disclosure.
Figure 9:
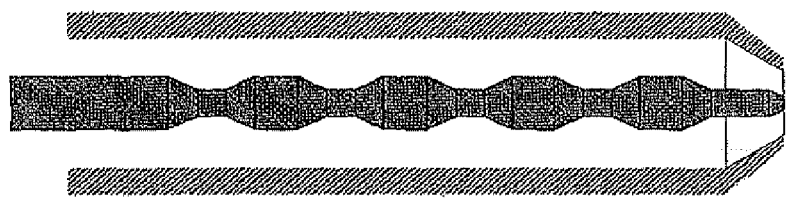
FIG. 9 illustrates an eighth embodiment of the hot runner modification of the injection system.
Figure 8:
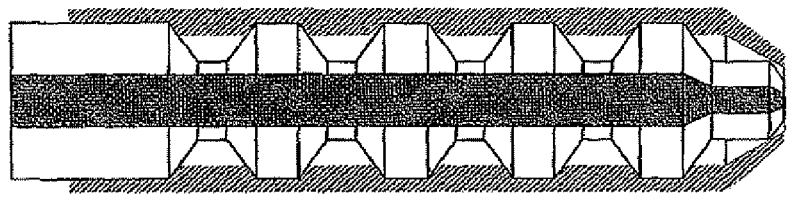
FIG. 8 illustrates a seventh embodiment of the hot runner modification of the injection system.
Figure 7:
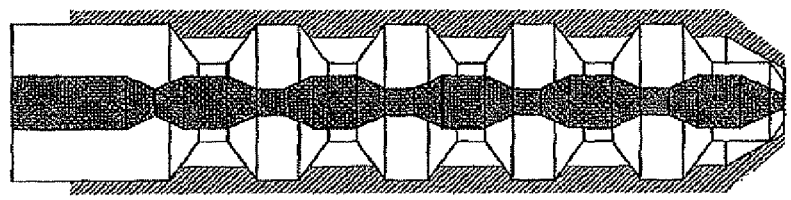
FIG. 7 illustrates a sixth embodiment of the hot runner modification of the injection system.

In the description, the following definitions have been applied for:

"Crystallizable polymer" means a polymer exhibiting both amorphous and crystalline regions when cooled to an equilibrium state below the melting point.

"Crystallinity" means the volume fraction of the crystallizable polymer that is packed in the crystalline state. This volume fraction is calculated as $P-P_a/P_cP_a$ where P is the density of the tested material; $P_a$ is the density of pure amorphous material (e.g. PET: 1.333 g/cm$^3$); and $P_c$ is the density of pure crystalline material (e.g. PET: 1.455 g/cm$^3$).

"Pre-stratified structure" means the regular or irregular sequence of variations in molecular pre-alignment/orientation and/or crystallinity between different locations of the cross-section of the preform. "Stratified structure" means the regular or irregular sequence of variations in molecular pre-alignment/orientation and crystallinity between different locations of the cross-section of the container.

As stated hereinabove, while a preform with reduced crystallinity level is preferred for stretch blow molding, a container having a higher degree of crystallinity is preferred for its overall enhanced end performance characteristics, including better thermal stability in case of exposure to elevated temperatures during its filling or usage cycle, increased gas permeation resistance and higher mechanical strength.

Unless special precautions are taken during the injection molding process (e.g. quenching techniques), injection molded articles in general, specifically preforms manufactured out of crystallizable polymers, consist of crystalline regions, where molecules are packed regularly and densely with strong short-range inter-chain interactions holding them together, and non-crystalline or amorphous regions, where molecular packing is either irregular and less dense and/or to some degree regular but even less dense than the irregular amorphous fraction.

In the crystalline regions, deformation (e.g. stretching by stretch blow molding) is much more difficult to achieve due to the strong short-range molecular inter-chain locking mechanism mentioned. Consequently, increasing the proportion of crystalline regions, that is, the increase in crystallinity, results in reduced stretch blowing capabilities.

In order to facilitate the stretch blow molding process, that transforms the predominantly amorphous preform through the intermediate step of amorphous chains orientation into a three-dimensional crystalline thus strong container, it is therefore state of the art practice to quench the polymer melt in the injection cavity so as to prevent the crystallization in the preform. As also the neck finish is quenched, it is as void of crystallinity as the body part. Contrary to the body part however, the neck finish, being clamped and restricted from heat-up and stretching, cannot crystallize during the stretch blow molding step.

The end result of the state of the art process is therefore a container with oriented crystalline body and less or non-oriented amorphous neck finish, which leads to the neck softening problems and the currently used workarounds, as described hereinabove.

The underlying governing physical principles are as follows:

When a polymer melt of a crystallizable polymer is cooled down rapidly, i.e. quenched, the material vitrifies before the onset of crystallization can take place. The vitrification process results in a drastic restriction of the macromolecular segmental mobility, in other words the vitrified macromolecules can no longer arrange themselves efficiently so as to start building crystallites. The vitrification process also locks in any pre-alignment/orientation of the macromolecules that may have been present in the polymer melt at the moment of quenching. The vitrified material is therefore amorphous in nature.

When the vitrified amorphous material is heated up in preparation for the stretch blow molding process, the locked in pre-alignment/orientation is released as soon as the vitrification temperature is reached. Since the heating cycle is very slow on a molecular time scale, relaxation processes can become active and the anisotropy that might have been locked in during the prior vitrification of the polymer melt may disappear again, leaving the material to a greater extent isotropic in nature.

Next, the heated material is biaxially stretched in the stretch blow molding process. Dependent on the temperature at which the stretch blow molding takes place, onset and rate of induced crystallization may vary. The period of time in which the preform is stretched to a container however is sufficiently long on a molecular time scale level to warrant crystallization, as can be appreciated by those skilled in the art. In addition, it is known to those skilled in the art that the rate of crystallization induced by the stretching process is much higher than any crystallization rate reached using the temperature parameter only.

Translating the above to the state of the art practice of manufacturing containers by the injection and stretch blow molding process, it has become clear why the neck finish exhibits less thermal stability than the body part of the container at the end of the stretching operation: The body part was quenched to an amorphous state during the injection molding process, was heated and stretch blow molded hereby becoming crystalline in nature as desired.

The neck finish was quenched to an amorphous state during the injection molding process, was left cold and restricted from stretching before respectively during the stretch blow molding process, and therefore remained amorphous in nature and void of any increase in crystallinity.

In order to increase the thermal stability of the neck finish, it needs to become crystalline in nature. Modifications and additions to the manufacturing process have been proposed as described earlier on. All of these suffer from being slow and hence add valuable and costly time to the manufacturing process. The reason for this is to be found in the second physical phenomenon mentioned: the difference in crystallization rate between heat-induced crystallization and mechanically induced crystallization, be this by shear, flow, stretching strain or the like.

In accordance with the present invention, it has now been surprisingly found that the effect of induced pre-alignment/orientation of macromolecules in the polymer melt may be synergistic with the effect of crystallinity, in an accelerated way. By use of the both effects, articles in general, or more specifically preforms and stretch blow molded articles, specifically containers, thereof can now be obtained, having superior properties that have never been attained by conventional methods described in the prior art.

According to the present invention, both the crystallinity and the pre-alignment/orientation of the macromolecules in the polymer melt govern the properties of the articles in general, specifically preforms and stretch blow molded articles, specifically containers, made out of crystallizable polymers.

The current invention combines the effect of pre-alignment/orientation of the macromolecules in the polymer melt with the well-known crystallinity effect in order to achieve the synergistic performance enhancement in the article in general, more particularly the preform and/or container.

By means of controlled local friction/shear through the introduction of modifications inside the hot runner system, the synergistic combination underlying the present invention allows introducing orientation gradients and hence stratification over the wall section of the articles made out of crystallizable polymers, including the preform and the resulting stretch blown container.

The mechanism of controlled local friction/shear and synergistic/cumulative combination of pre-alignment/orientation and crystallization of the crystallizable polymer in turn allows creating a pre- and stratified structure across the manufactured end products, like preforms and containers, leading to end articles having high thermal resistance, gas permeation resistance and mechanical strength.

By creating said orientation gradients and pre- and stratified structures, articles like preforms can be made that will result in equal or superior end performance characteristics in the containers manufactured thereof at optimized wall thickness and/or retain the necessary dimensions in the neck finish and/or body part when the final container is being subjected to elevated temperatures during its filling or usage cycle.

By controlling the local friction/shear and resulting pre-alignment/orientation of the macromolecules of the crystallizable polymer within the injection process, the mechanisms, positions and rates of movement of the molecules thereof are regulated both in the polymer melt matrix and in the final wall matrix in the articles manufactured, like in the preform and the stretch blow molded article thereof.

More practically, in the method according to the present invention, the amount of pre-alignment/orientation of the macromolecules of the crystallizable polymer in the polymer melt and the resultant molecular orientation and orientation gradients obtained in the article in general are regulated primarily within the hot runner system. The nature—semi-crystalline or amorphous—and the distribution of this nature across selected regions of the article in general, specifically the preform after the injection molding process, is regulated primarily within the preform cavity of the injection process.

As stated above and in accordance with the present invention, the pre-alignment/orientation of the macromolecules is induced by controlling the local friction/shear within the injection process.

To generally align macromolecules that facilitate creation of the desired orientation gradients and pre- and stratified structures in the article in general, specifically in the preform, the polymer melt macromolecules are oriented in the hot runner of the injection system by controlling the locally applied friction/shear. This can, amongst others, be achieved by passing the molten polymer through specially designed internal hot runner modifications such as profiling of the bus and/or needle or placing inserts within the hot runner system. If needed, this can be combined with high injection pressure or repetitive compression and decompression cycles.

In contrast with hot runners for state of the art injection molding processes whereby these hot runners are typically designed to avoid friction/shear when the polymer flows through the hot runner, the present invention utilizes the control of locally applied friction/shear in the said hot runner as means to introduce preferred pre-alignment/orientation of the macromolecules. Additional friction/shear can also be induced at the entrance to the preform cavity.

The basic principle behind this feature is the fact that the flow path or flow channel, through which the selected materials will flow, is being modified from a cross-sectional point-of-view and in relation to its length. The hot runner construction is modified in a manner to force the polymer melt into pre-alignment/orientation.

The variations of said modifications of hot runner construction include configurations of the hot runner which can be obtained by applying some of the following, non-exhaustive or non-limitative adjustments, either used alone or in combination:

i) changing the diameter of the flow channel,
ii) introducing Venturi restrictions for the melt flow, followed by channels of defined length producing subsequent expansion of the flow,
iii) appropriate sloping of said restrictions or expansions, Practically, without being limitative or exhaustive, this can be realized by profiling of the needle and/or the outer housing of the hot runner (bus) and/or introducing inserts (e.g. geometrical configurations selected from one or more of concentric tubes, star wheels, or zones having diameter variations), at selected positions in the hot runner.

Additional friction/shear at the entrance to the preform cavity can be achieved by reducing the orifice hole inside the hot runner.

The final flow channels obtained in the hot runner can be very diverse in design and can be symmetrical or non-symmetrical as required to achieve the desired final stratified configuration of the container.

Without wishing to be bound by any theory, the physical and chemical phenomena that form the basis for the invention will now be described:

It is common knowledge that quenching of isotropic polymer melts leads to vitrification of the macromolecules at a temperature, characteristic for that particular polymer, the so-called glass transition temperature. Below the glass transition temperature, the macromolecular segmental mobility is drastically restricted, as the macromolecules are "frozen in". Above the glass transition temperature the macromolecular segmental mobility increases steadily with increase of temperature. As the amount of macromolecular segmental mobility increases, matrix randomization, known as relaxation, becomes more and more predominant, leading ultimately to an isotropic melt.

It is known by those skilled in the art that anisotropic, i.e. pre-aligned/oriented, polymer melts behave quite differently upon quenching/cooling. Dependent on the degree of pre-alignment/orientation, the vitrification process takes place at temperatures exceeding the characteristic glass transition temperature of the polymer and the vitrification leads to a more dense amorphous structure.

Therefore, when a polymer melt featuring different degrees of pre-alignment/orientation, such as a stratified polymer melt, is quenched, those parts exhibiting the highest degree of pre-alignment/orientation will vitrify first, i.e. at the highest temperature, whereas those parts exhibiting no pre-alignment/orientation will vitrify at the glass transition temperature. Parts featuring intermediate degrees of pre-alignment/orientation will vitrify at intermediate temperatures. The result is a highly anisotropic amorphous polymer glass, featuring regions with molecular packing ranging from fully random, i.e. irregular, to structured, i.e. pre-aligned/oriented. These orientation gradients translate into density gradients, with the structured regions featuring a higher density.

Upon reheating the cooled vitrified polymer matrix, onset of macromolecular segmental mobility will occur in the reversed order, i.e. the lower the degree of pre-alignment/orientation in the glassy state, the earlier (i.e. at lower temperature) the onset of macromolecular segmental mobility (which as stated before leads to randomization into an isotropic structure, i.e. relaxation) once the glass transition temperature is crossed in the heat-up process.

From the above, it is clear that the pre-alignment/orientation frozen in into the glassy state during the first quenching process is retained after heating up such a polymer matrix above its glass transition temperature. Dependent on the ultimate temperature reached in the heating cycle, some regions in the polymer matrix will remain vitrified, namely those with increasing degrees of pre-alignment/orientation that vitrified at temperatures exceeding the one reached in the heat-up cycle.

These phenomena thus enable to maintain the during the injection process in the preform induced pre- and stratified structure during the preheating prior to stretch blow molding and then to transform the stratified amorphous structure into a stratified crystalline structure in the stretch blow molding process.

Variations in the cooling/quenching rate in the injection cavity enable streamlining the nature—amorphous or semi-crystalline—of the vitrified polymer melt.

Whereas fast quenching locks in pre-alignment/orientation in the glassy vitrified state, reduced rates of cooling/quenching allow for competition to progressively develop between the vitrification and crystallization processes.

As it is known for those skilled in the art that pre-alignment/orientation accelerates the rate of crystallization dramatically with respect to the heat induced crystallization, relatively small differences in cooling rate can cause significant differences in the nature of the cooled polymer matrix.

Contrary to the additional heating steps utilized in the current state of the art processing as described earlier on, the crystallization of the strongly pre-aligned/oriented polymer fraction in the pre- and stratified structure occurs on a much smaller time scale and well within the time frame typical for state of the art preform injection cycle times and/or limited extensions thereof.

Figure 10B:
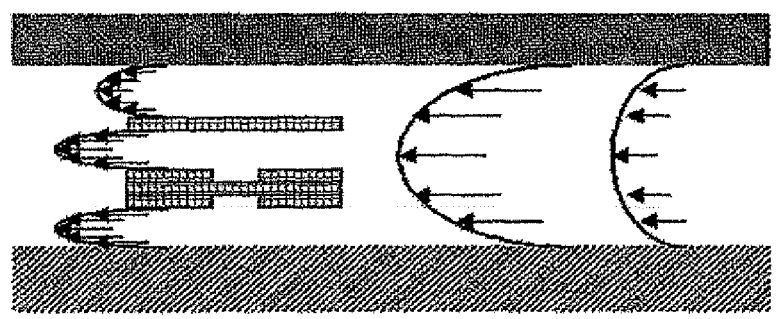
FIG. 10a-10b is a schematic representation of the regular or irregular sequence of variations in molecular pre-alignment/orientation in accordance with the hot runner modification of the injection system.
Figure 10A:
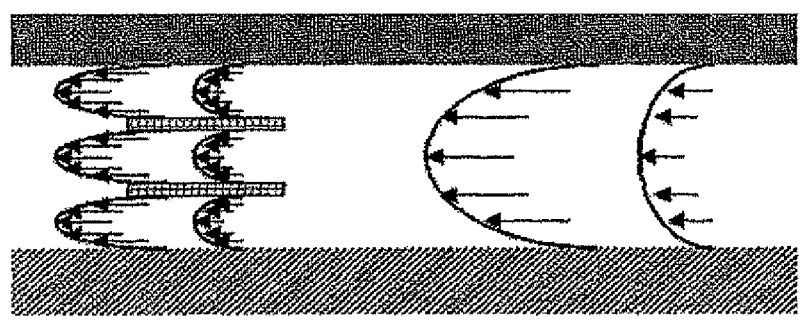

Above phenomena allow for the introduction of the regular or irregular sequence of variations in molecular pre-alignment/orientation (see FIG. 10A and 10B) and/or crystallinity between different locations of the cross-section of the preform.

Adjusting the cooling/quenching rate in the injection cavity appropriately (i.e. time and location wise) will facilitate manufacturing in the injection molding process a preform, having substantial pre-stratified structure. Such a preform will be transformed into a crystalline container during the sole stretch blow molding process with no need for additional heating or processing steps to strengthen the neck finish.

Above phenomena equally allow for the introduction of the regular or irregular sequence of variations in molecular pre-alignment/orientation and crystallinity between different locations of the cross-section of the container.

By adjusting the cooling/quenching rate in the injection cavity appropriately (i.e. time and location wise), it will facilitate manufacturing in the injection molding process of a container having substantial stratified structure in the body part. Such a container will not need additional heating or processing steps to strengthen the neck finish.

The different levels of cooling are preferably maintained by thermal insulation of the regions requiring lower cooling rates. This thermal insulation can be accomplished e.g. by utilizing a combination of low and high thermal conduct materials as inserts.

The processes according to the present invention preferably accomplish the making of a preform within the preferred cycle times, and/or limited extensions thereof, for standard PET preforms of similar size, design and weight by standard methods currently used in preform production. Said processes are enabled by tooling design and process techniques to allow for the simultaneous generation of orientation gradients and different degrees of crystallinity in particular locations on the preform.

The cooling of the mold in preform regions for which it is preferred that the material be generally amorphous or semi-crystalline, is accomplished by chilled fluid circulating through selected regions of the mold cavity and core.

Bearing in mind the consideration about the mechanism of the invention described hitherto, it will be readily understood that the injection process conditions can be optimized to the well specified range in order to make the articles in general, more particularly the preforms and resulting stretch blow molded containers of the present invention.

The present invention can be applied to various crystallizable polymers to manufacture articles in general, specifically preforms and containers through processes including injection and stretch blow molding.

The preform and container may be made solely of PET or another crystallizable polymer, preferably but not exclusively an aromatic or aliphatic polyester, a blend of aromatic or aliphatic polyesters, an aromatic or aliphatic polyester copolymer or any combination thereof.

Preferred examples include polyethylene terephthalate (PET), polyethylene naphthalate (PEN), polytrimethylene terephthalate (PTT), polytrimethylene naphthalate (PTN), polylactic acid (PLLA) and copolymers and blends thereof.

The preforms made out of crystallizable polymers are preferably monolayer i.e. comprised of a single layer of a base material, or they may be multilayer, including, but not limited to, those which comprise a combination of a base material and a barrier material.

The material in each of these layers may be a single type of a crystallizable polymer or it may be a blend of crystallizable polymers.

In accordance with the present invention, it has also been found that the pre-alignment/orientation of the amorphous macromolecules can be further positively influenced through the utilization of a crystallizable polymer with a higher molecular weight, as once orientation has been achieved, pre-aligned macromolecules from a crystallizable polymer with a higher molecular weight exhibit a higher resistance to relaxation, herewith retaining the orientation over a longer time period.

It is clear that a method according to the present invention may have convincing advantages compared to prior art methods. In specific, for articles in general, or more particularly preforms and containers made out of crystallizable polymers by manufacturing processes including injection and stretch blow molding, through the achievement of stratification in the body and the neck finish during the injection molding step, the desired end benefits can be obtained including, amongst others, minimized dimensional variations in the neck finish under elevated temperatures due to the higher average level of crystallinity reached in the neck finish, equal or better gas permeation resistance and higher mechanical strength.

Furthermore, by the process of the present invention, the prior art steps of exposure to thermal heating elements, crystallization of select portions, utilization of high glass transition temperature materials in combination with more complex injection molding processes and/or the processes including post-mold thermal crystallization can be eliminated and the manufacturing of the said preforms and containers occurs within the usual standard manufacturing time frame and/or limited extensions thereof.

In particular for articles in general made by processes including injection and/or stretch blow molding operations, and more particularly for preforms and containers made out of crystallizable polymers, the present invention can lead to a further reduction of the article's wall thickness given the increased mechanical strength obtained from the creation of the stratification across the article wall. In turn the reduction of the wall thickness can create a substantial increase in the operational output of the injection and/or stretch blow molding process. These benefits combined allow for a further reduction of the total cost of ownership of the produced articles in general, specifically preforms and containers made out of crystallizable polymers.

Having the increased mechanical strength of the finally blown container also allows for the absorption of the vacuum upon cooling of the liquid which enables the making of containers having a simpler design and geometry compared to conventional containers having vacuum panels and/or other specially designed features in the bottle geometry allowing the vacuum absorption.

The above advantages make the articles of the present invention very suitable for high speciality applications including hot-fill applications and diverse carbonated and/or non-carbonated beverage applications.

EXAMPLES

1. Injection System (FIG. 1)
    a. A commercially available grade of a crystallizable polymer, being PET, is taken within a classical IV range of 0.78-0.82, like reference M & G Cobiter 80.
    b. The polymer material referenced under 1a. is converted on a classical injection machine, like type Huskey, operated at typical machine settings :
    Extruder Barrel 270-290° C.
    Nozzle 270-290° C.
    Manifold 275-295° C.
    Gates 280-300° C.
    Mold Cooling Water 10-15° C.
    Cycle Time 10-60 seconds
    c. Position 1b is repeated with a commercially available grade of a crystallizable polymer, being PET, with an increased IV range of 0.82-0.86, like reference M & G Cleartuf Max.
    d. Position 1b is repeated with a commercially available grade of a crystallizable co-polymer, being PET based, within a classical IV range of 0.78-0.82, like reference M & G Cleartuf 8006.
2. Hot Runner System
    a. Positions 1a through 1d are executed with normal classical hot runner configuration for injected preform production.
    b. Positions 1a through 1d are repeated with the incorporation of specific hot runner modifications as referenced under FIGS. 2 through 9.
3. Injection Preform
    a. Positions described under 1 and 2 are executed with the use of an industry available preform suitable for an injection stretch blow molded bottle of a selected volume size.
    b. Position 3a is repeated but with the use of an industry available preform suitable for an injection stretch blow molded bottle, the preform having a reduced axial stretch ratio for the selected volume size.
    c. Position 3a is repeated with adapted preform mold temperatures in-between 8 and 60° C. for either neck and/or body area.
    d. Position 3b is repeated with adapted preform mold temperatures in-between 8 and 60° C. for either neck and/or body area.
4. Preform Reheating Process
    a. The preforms obtained from positions 3a through 3d are reheated on an conventional blow molding machine, like Sidel, operated under preform reheat temperature range of 90 to 95° C.
    b. The preforms obtained from positions 3a through 3d are reheated on an conventional blow molding machine, like Sidel, operated under preform reheat temperature range of 100 to 110° C.
    c. The preforms obtained from positions 3a through 3d are reheated on an conventional blow molding machine, like Sidel, operated under preform reheat temperature range of 120 to 130° C.
5. Blow Molding Process
    a. The preforms obtained from positions 4a through 4c are blown in a conventional blow mold suitable for an injection stretch blow molded bottle of the selected size operated at mold temperature of 23° C.
    b. The preforms obtained from positions 4a through 4c are blown in a conventional blow mold suitable for an injection stretch blow molded bottle of the selected size operated at mold temperature of 80° C.

c. The preforms obtained from positions 4a through 4c are blown in a conventional heat set blow mold suitable for an injection stretch blow molded bottle of the selected size operated at mold temperature of 160° C.

The above example demonstrate the benefits as set out in the description with respect to end functional properties including improvements on mechanical strength, barrier performance, dimensional stability and optimized wall thickness about 0.2 mm of the resulting stretch blown container as the general injection and blow molding processing output. The resulting containers are ideally used for hot fill applications (with shrinkage percentage being less than about 4%) and for diverse carbonated and/or non-carbonated beverage applications.

In the specification and the figures only typical embodiments have been disclosed. Specific terms have been used in a generic and descriptive sense and done not for the purpose of limitation. As apparent to those skilled in the art, it should be understood that this invention is not to be unduly limited to the illustrative example as set out hereinabove.

The invention claimed is:

1. An injection molded article comprising at least one crystallizable polymer, injection molded article further comprising a regular sequence of variations in molecular pre-alignment/orientation of the at least one crystallizable polymer between different locations of the cross-section of the injection molded article.

2. An injection molded article comprising at least one crystallizable polymer, with said injection molded article further comprising a regular sequence of variations in crystallinity of the at least one crystallizable polymer between different locations of the cross-section of the injection molded article.

3. The injection molded article of claim 1, wherein the at least one crystallizable polymer is PET, high IV PET or modified PET.

4. The injection molded article of claim 3, comprising, as copolymers suitable for modifying the container's physical characteristics polyamide, PGA, PEN, or mixtures thereof.

5. The injection molded article of claim 3, comprising, as additives to the at least one crystallizable polymer, antioxidants, UV-absorbers, dyes, colorants, nucleating agents, fillers and mixtures thereof.

6. The injection molded article of claim 1, wherein a shrinkage percentage of a container blow molded from the injection molded article during hot fill operations is less than about 4%.

7. The injection molded article of claim 1, wherein parts of a container blow molded from the injection molded article have wall thicknesses less than about 1 mm.

8. The injection molded article of claim 1, wherein the injection molded article is a monolayer structure preform.

9. The injection molded article of claim 1, wherein the injection molded article is a multilayer structure preform.

10. The injection molded article of claim 2, wherein a shrinkage percentage of a container blow molded from the injection molded article during hot fill operations is less than about 4%.

11. The injection molded article of claim 2, wherein parts of a container blow molded from the injection molded article have wall thicknesses less than about 1 mm.

12. The injection molded article of claim 2, wherein the injection molded article is a monolayer structure preform.

13. The injection molded article of claim 2, wherein the injection molded article is a multilayer structure preform.

* * * * *

UNITED STATES PATENT AND TRADEMARK OFFICE
CERTIFICATE OF CORRECTION

| | |
|---|---|
| PATENT NO. | : 10,954,337 B2 |
| APPLICATION NO. | : 16/158392 |
| DATED | : March 23, 2021 |
| INVENTOR(S) | : Steven Dircx |

It is certified that error appears in the above-identified patent and that said Letters Patent is hereby corrected as shown below:

In the Claims

Claim 1, Line 2, insert the words -- with said -- after the "," following the word polymer and before the word injection.

Signed and Sealed this
Twenty-seventh Day of August, 2024

Katherine Kelly Vidal
*Director of the United States Patent and Trademark Office*